United States Patent
Ohara et al.

(10) Patent No.: US 11,909,525 B2
(45) Date of Patent: Feb. 20, 2024

(54) COMMUNICATION SYSTEM, COMMUNICATION METHOD, AND COMMUNICATION APPARATUS

(71) Applicant: SONAS, INC., Tokyo (JP)

(72) Inventors: Sotaro Ohara, Tokyo (JP); Makoto Suzuki, Tokyo (JP)

(73) Assignee: SONAS, INC., Tokyo (JP)

(*) Notice: Subject to any disclaimer, the term of this patent is extended or adjusted under 35 U.S.C. 154(b) by 227 days.

(21) Appl. No.: 17/542,987

(22) Filed: Dec. 6, 2021

(65) Prior Publication Data

US 2022/0094475 A1 Mar. 24, 2022

Related U.S. Application Data

(63) Continuation of application No. PCT/JP2020/021992, filed on Jun. 3, 2020.

(30) Foreign Application Priority Data

Jun. 7, 2019 (JP) .................................. 2019-107428

(51) Int. Cl.
*H04L 1/00* (2006.01)
*H04W 28/04* (2009.01)
(Continued)

(52) U.S. Cl.
CPC .......... *H04L 1/0061* (2013.01); *H04W 28/04* (2013.01); *H04W 40/023* (2013.01); *H04W 84/18* (2013.01)

(58) Field of Classification Search
CPC ..... H04L 1/0061; H04L 47/32; H04L 1/0045; H04L 2001/0097; H04W 28/04;
(Continued)

(56) References Cited

U.S. PATENT DOCUMENTS 4,862,461 A * 8/1989 Blaner .................. H04L 9/40
714/749
8,948,037 B1 * 2/2015 Mizrahi .............. H04L 43/0847
370/252
(Continued)

FOREIGN PATENT DOCUMENTS

FR 2922390 A1 4/2009
JP H03174841 A 7/1991
JP 2008042911 A 2/2008

OTHER PUBLICATIONS

Extended European Search Report dated Jul. 5, 2022, issued in corresponding European Application No. 20819497.7. (10 pages).
(Continued)

*Primary Examiner* — Shelly A Chase
*Assistant Examiner* — Osman M Alshack
(74) *Attorney, Agent, or Firm* — BUCHANAN INGERSOLL & ROONEY PC

(57) ABSTRACT

There is provided a communication system for performing communication by flooding using concurrent transmission among a plurality of communication nodes including a transmission node, a relay node, and a destination node. The transmission node generates and transmits the packet including predetermined transmission data, a first error detection code for the transmission data, and a second error detection code for the transmission data, timing information corresponding to a transmission timing of the packet, and the first error detection code. The relay node receives the packet, performs error detection based on the second error detection code, and updates the second error detection code and reconstructs and transmits the packet if no error is detected. The destination node receives the packet, and performs error detection based on the first error detection code.

15 Claims, 10 Drawing Sheets

(51) Int. Cl.
*H04W 40/02* (2009.01)
*H04W 84/18* (2009.01)

(58) Field of Classification Search
CPC ... H04W 40/023; H04W 84/18; H04W 40/22; H04W 4/38; H04W 52/0225; H04W 52/0229
USPC .......................................... 714/776, 748–750
See application file for complete search history.

(56) References Cited

U.S. PATENT DOCUMENTS

| | | | |
|---|---|---|---|
| 2008/0031250 A1* | 2/2008 | Mehta | H04L 45/24 370/392 |
| 2008/0062901 A1 | 3/2008 | Kadowaki et al. | |
| 2009/0103441 A1 | 4/2009 | Nakamura | |
| 2017/0111483 A1* | 4/2017 | Wang | H04L 47/12 |
| 2017/0214607 A1* | 7/2017 | Kim | H04L 1/16 |
| 2017/0230144 A1* | 8/2017 | Wu | H04L 1/08 |
| 2017/0295455 A1* | 10/2017 | Kwon | H04B 7/155 |
| 2018/0084479 A1* | 3/2018 | Kudou | H04W 4/027 |
| 2020/0068656 A1* | 2/2020 | Yang | H04W 40/24 |
| 2020/0084833 A1* | 3/2020 | Kwan | H04B 17/382 |
| 2020/0092203 A1* | 3/2020 | di Marco | H04L 69/22 |
| 2021/0045032 A1* | 2/2021 | Choi | H04W 12/06 |

OTHER PUBLICATIONS

Ferrari, et al., "Efficient Network Flooding and Time Synchronization with Glossy", IPSN'11, 2011, 12 pages.
International Search Report (PCT/ISA/210) with translation and Written Opinion (PCT/ISA/237) dated Aug. 25, 2020, by the Japan Patent Office as the International Searching Authority for International Application No. PCT/JP2020/021992.

* cited by examiner

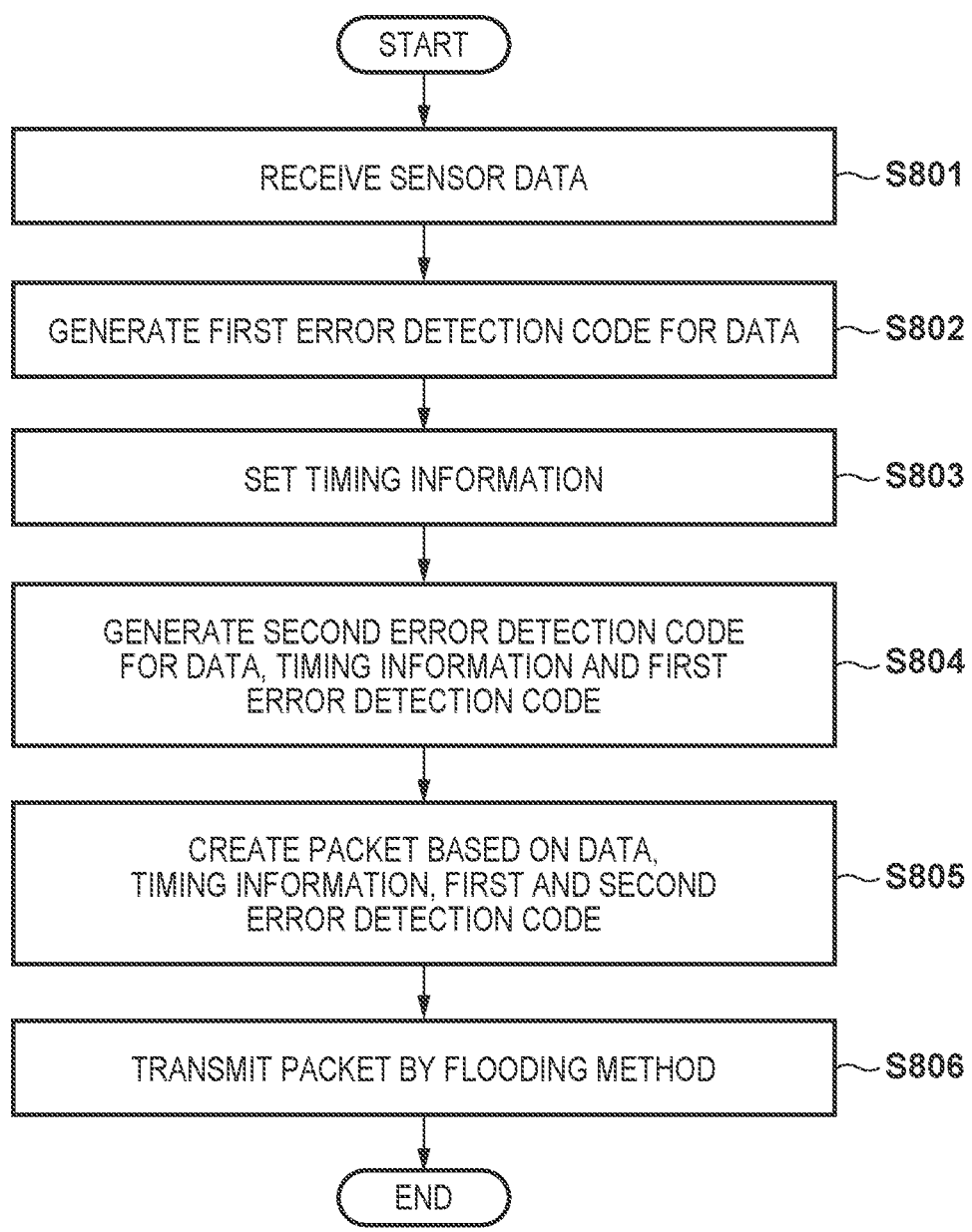

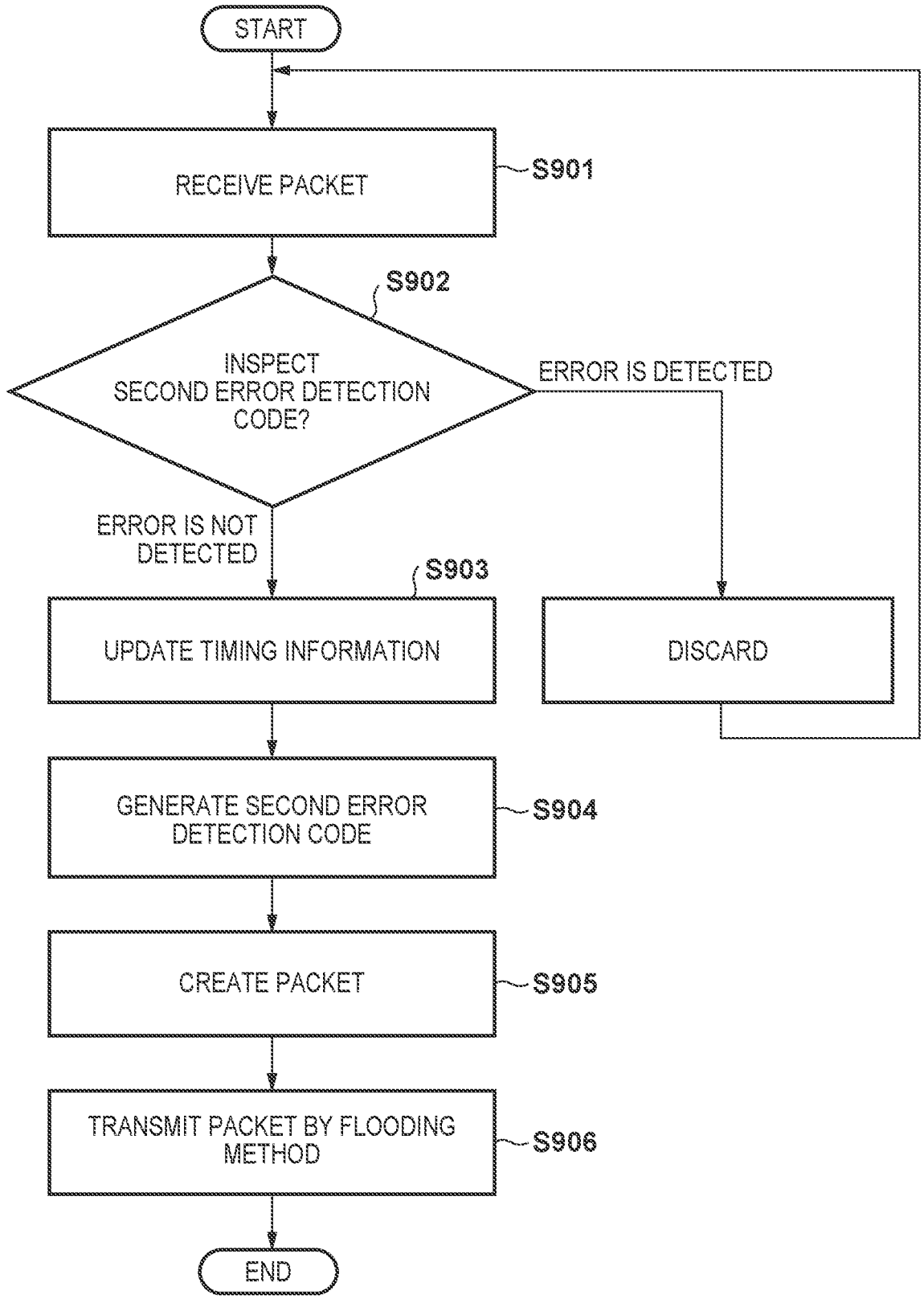

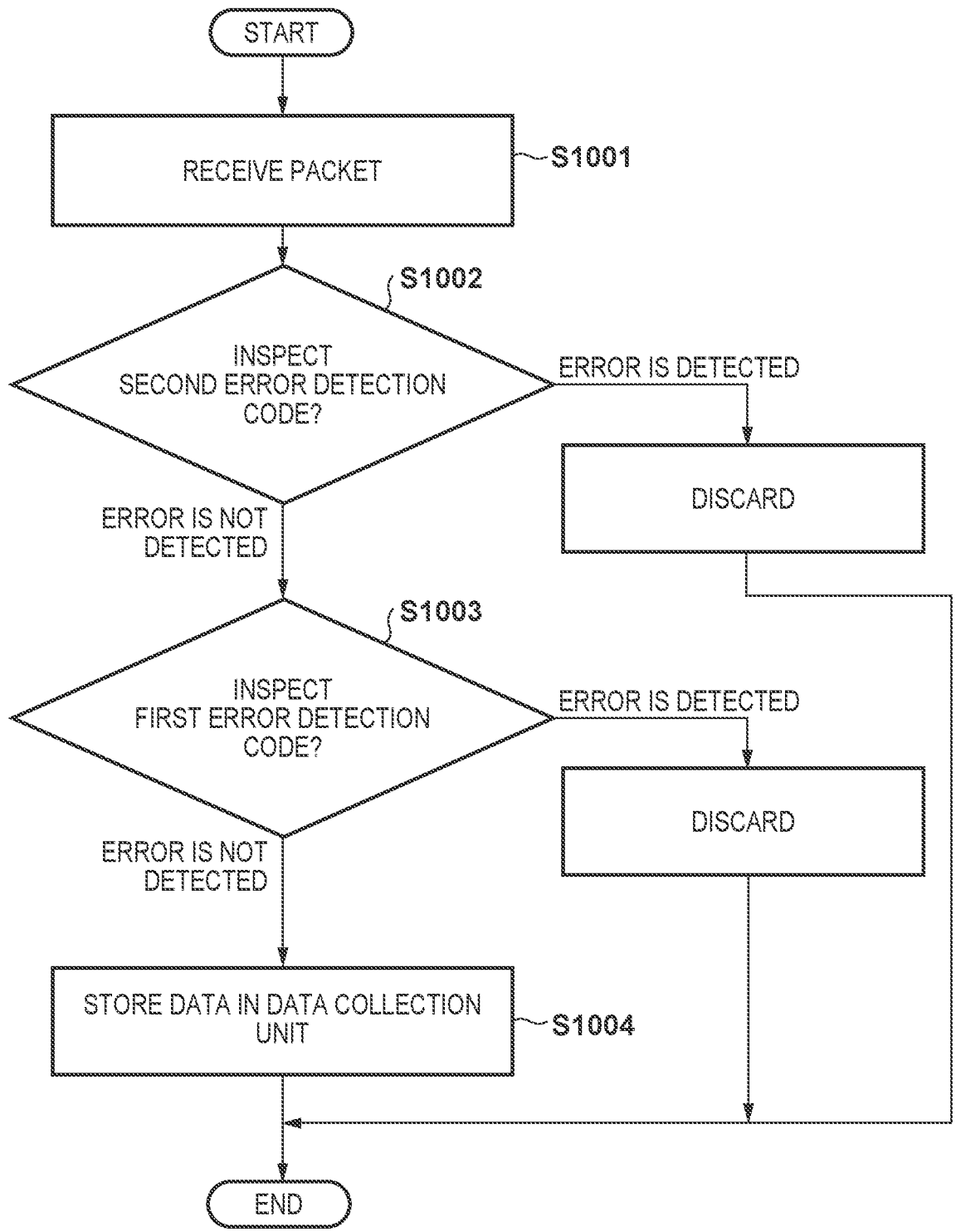

COMMUNICATION SYSTEM, COMMUNICATION METHOD, AND COMMUNICATION APPARATUS

CROSS-REFERENCE TO RELATED APPLICATION(S)

This application is a continuation of International Patent Application No. PCT/JP2020/021992 filed on Jun. 3, 2020, which claims priority to and the benefit of Japanese Patent Application No. 2019-107428 filed on Jun. 7, 2019, the entire disclosures of which are incorporated herein by reference.

TECHNICAL FIELD

The present invention relates to a communication system for performing communication in a flooding method, a communication method, and a communication apparatus.

BACKGROUND ART

When a plurality of sensor nodes are arranged to perform data collection, there is proposed a broadcast method called flooding that uses concurrent transmission to improve the probability of data collection while suppressing the power consumption of the sensor nodes (see, for example, NPL 1).

In the flooding method that uses concurrent transmission, when one sensor node performs data transmission, one or more relay nodes that have received the data broadcast the same data after the data reception. When the relay nodes repeatedly perform concurrent transmission of wireless signals a plurality of times, it is possible to transmit the data to the overall wireless communication system. In the flooding method that uses concurrent transmission, the plurality of nodes transmit the same data concurrently or almost concurrently, and the relay node can perform decoding by receiving the signals from the plurality of nodes concurrently or almost concurrently. In addition, routing is unnecessary, implementation is easy, and the power consumption can be reduced.

As a similar method, each communication node is assigned with a time slot, and transmits data of the self-node using the flooding method within the time slot, and a relay node that has received the data relays the data within the assigned time slot. This is repeated to relay the data transmitted from the transmission node so as to finally reach a data collection node (see, for example, NPL 2).

PTL 1 describes a technique in which a packet is transmitted from a transmission source node to a destination node via a relay node, CRC (Cyclic Redundancy Check) is included in the packet, and the relay node discards a packet that cannot be decoded.

CITATION LIST

Patent Literature

PTL 1: Japanese Patent Laid-Open No. 2008-42911

Non Patent Literature

NPL 1: F. Ferrari et al., "Efficient Network Flooding and Time Synchronization with Glossy", IPSN'11, 2011
NPL 2: Chao GAO et al., "Efficient Collection Using Constructive-Interference Flooding in Wireless Sensor Networks", Proceedings of the Society Conference of IEICE 2011 communication (2), 428, 2011-08-30

SUMMARY OF THE INVENTION

Technical Problem

In a protocol suitable for collection of sensor data, for example, IEEE802.15.4, CRC16 is used for FCS (Frame Check Sequence). Since, when data collection is performed by communication by the flooding method that uses concurrent transmission, the relay nodes are configured to transmit received data at almost the same timing, a large delay is unacceptable at the time of relaying. Furthermore, since the relay node is often driven by a battery for a long period, the power consumption of the relay node is preferably as low as possible. To achieve this, the relay node used in the flooding method is required to reduce the time and power necessary for processing such as generation of an error detection code, and thus it is preferable to avoid the use of FCS having a long bit length. On the other hand, in communication by the flooding method, a node close to a transmission node does not always relay data. A relay node apart from the transmission node may receive data, decode erroneous data as normal data depending on a reception condition, and then transmit the data to the next nodes. With respect to collection of sensor data, sensor data arranged at a number of places are often collected at a predetermined time interval for a long period. Consequently, the number of times of occurrence of a data transmission error may increase as the number of times of transmission of data and a data amount increase. Therefore, it is also demanded to use FCS that has error detection performance higher than that of CRC16 and has a long bit length.

The present invention has been made in consideration of the above problem, and provides a technique advantageous in improving the detection accuracy of a data transmission error in a wireless communication system for performing communication using the flooding method that uses concurrent transmission.

Solution to Problem

To solve the above problem, according to the present invention, there is provided a communication system for performing communication by flooding using concurrent transmission among a plurality of communication nodes, the plurality of communication nodes including one of a transmission node configured to generate and transmit a packet, a relay node configured to relay the packet, and a destination node as a destination of the packet, the system characterized in that the transmission node generates and transmits the packet including predetermined transmission data, a first error detection code for at least the transmission data, and a second error detection code for at least the transmission data, timing information corresponding to a transmission timing of the packet, and the first error detection code, the relay node receives the packet, performs error detection based on the second error detection code, and discards the packet if an error is detected, and updates the second error detection code and reconstructs and transmits the packet if no error is detected, and the destination node receives the packet from one of the transmission node and the relay node, and performs error detection based on at least the first error detection code.

Advantageous Effects of Invention

According to the present invention, it is possible to provide a technique advantageous in improving the detection accuracy of a data transmission error in a wireless communication system using the flooding method that uses concurrent transmission.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 8 is a flowchart illustrating an example of processing executed by the transmission node according to the embodiment;

FIG. 9 is a flowchart illustrating an example of processing executed by the relay node according to the embodiment; and FIG. 10 is a flowchart illustrating an example of processing executed by the sink node according to the embodiment.

DESCRIPTION OF THE EMBODIMENTS

Figure 1:
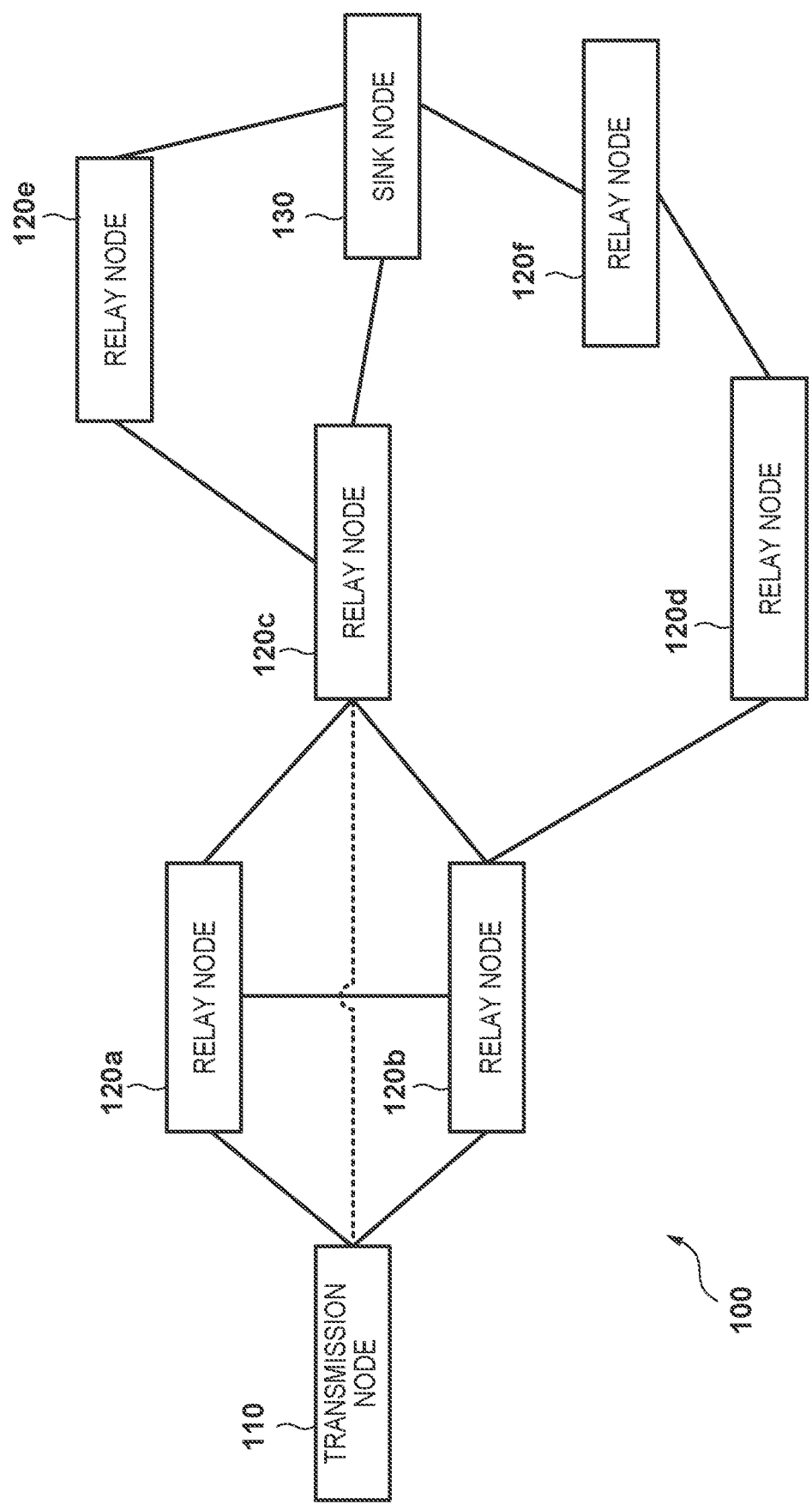
FIG. 1 is a block diagram showing an example of the configuration of a wireless communication system according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a wireless communication system 100 including relay nodes according to the first embodiment.

In this example, the wireless communication system 100 includes a transmission node 110 that serves as a communication node for performing communication to generate and transmit a packet, relay nodes 120a to 120f that relay the packet, and a destination node as the destination of the packet. A sink node 130 that collects data will be exemplified as the destination node.

The transmission node of the wireless communication system according to this embodiment generates and transmits a packet including sensor data at a predetermined timing. Upon receiving the packet, the relay node broadcasts the same packet using the flooding method. By repeating this reception operation and transmission operation, the data transmitted from the transmission node 110 is collected by the sink node 130 as the destination of the packet. The transmission node 110 transmits data, and the relay nodes 120 relay the data by repeating broadcasting using the flooding method. A period from when the transmission node 110 transmits data until the sink node 130 receives the relayed data will be referred to as a flooding slot hereinafter. In the flooding slot, a time slot in which each communication node performs transmission or reception will be referred to as a sub-slot hereinafter.

Note that the wireless communication system including the one transmission node 110, the plurality of relay nodes 120a to 120f, and the one sink node 130 as the destination node will be exemplified with reference to FIG. 1. However, the wireless communication system may include a plurality of transmission nodes 110 and a plurality of sink nodes 130.

This embodiment assumes that the transmission node 110 and the relay node 120 are separate communication nodes. However, the transmission node 110 may operate as the relay node 120. Furthermore, the relay node 120 can operate as the transmission node 110. A case in which, when the communication nodes are arranged, as shown in FIG. 1, the packet is transmitted from the transmission node 110 to the sink node 130 via the communication nodes each having a short distance, as indicated by solid lines, will be described below.

Figure 2:
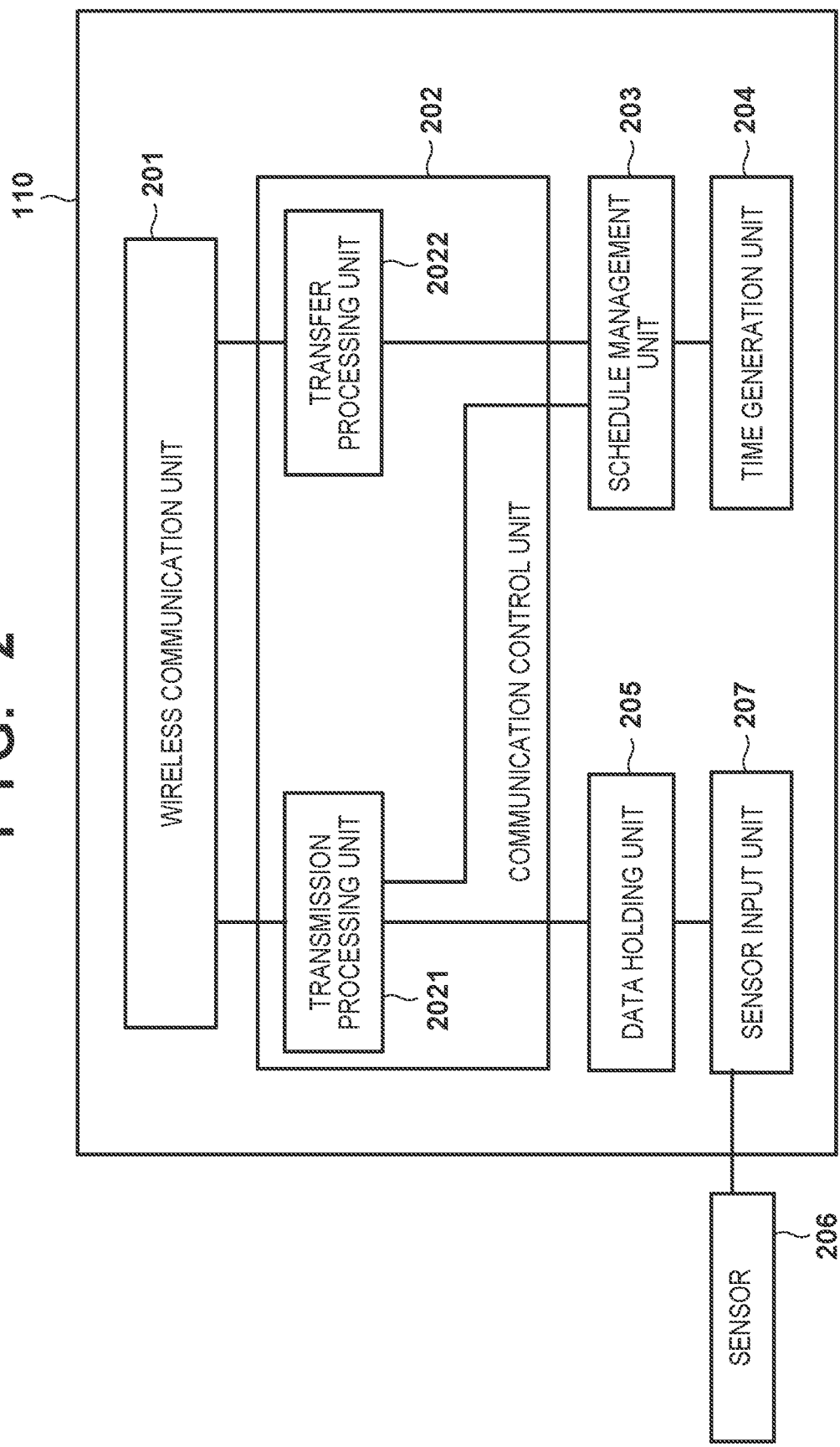
FIG. 2 is a functional block diagram of a transmission node according to the embodiment.

Before an explanation of communication by the flooding method that uses concurrent transmission between the communication nodes, each type of communication node will be described. In this embodiment, the transmission node 110 will be described with reference to FIG. 2 by exemplifying a case in which the transmission node 110 transmits data from a sensor. The transmission node 110 includes a wireless communication unit 201 with a transmission unit and a reception unit, a communication control unit 202, a schedule management unit 203, a time generation unit 204, a data holding unit 205, and a sensor input unit 207. The communication control unit 202 includes a transmission processing unit 2021 and a transfer processing unit 2022. In this example, a sensor 206 is connected to the sensor input unit 207 of the transmission node 110. However, the transmission node 110 may include the sensor 206.

The sensor 206 performs predetermined sensing at an installation place, and transmits sensed data to the transmission node 110. The wireless communication unit 201 is a module operating as a wireless communication transmission/reception unit, and wirelessly transmits/receives data to/from another relay node 120 via an antenna of the wireless communication unit 201 or an external antenna (not shown). The communication control unit 202 manages the communication state of the wireless communication unit 201, and causes the wireless communication unit 201 to execute transmission/transfer processing in accordance with a decided sequence.

The transmission processing unit 2021 of the communication control unit 202 sends data from the data holding unit 205 to the wireless communication unit 201. At this time, the transmission processing unit 2021 can generate the first error detection code for the data and add it to the data. The transfer processing unit 2022 of the communication control unit 202 receives a packet from another communication node via the reception unit of the wireless communication unit 201, and also serves to perform relay processing of analyzing the data from the other communication node and broadcasting the received packet. If, at this time, an error of the second error detection code (to be described later) included in the packet is detected, the packet is discarded. Furthermore, the transfer processing unit 2022 changes timing information (to be described later) included in the packet in the relay processing. The data transmitted by the wireless communication unit 201 will be described later with reference to FIG. 6. Furthermore, the wireless communication unit 201 generates the second error detection code for the packet to be transmitted, and transmits the packet including the second error detection code. As the first error detection code, a code with error detection accuracy higher than that of the second error detection code is used. The error detection code is an error detection code in the data link layer. For example, the first error detection code is CRC32, and the second error detection code is CRC16 having a bit length shorter than that of the first error detection code.

The sensor input unit 207 receives the data from the sensor 206, and sends it to the data holding unit 205. The data holding unit 205 includes a memory that holds sensor data from the sensor input unit 207 in association with time. The schedule management unit 203 manages the transmission/reception timing of the transmission node 110. Furthermore, the schedule management unit 203 holds parameters necessary for communication by the flooding method, such as a flooding slot length, a sub-slot length, and the maximum number of transmissions in the flooding slot. The time generation unit 204 is a timer and is used to set the control timing of each processing unit. This embodiment will exemplify the transmission node that transmits data from the sensor but the present invention is not limited to transmission of data from the sensor. For example, the transmission node can transmit information from another information processing apparatus.

Figure 3:
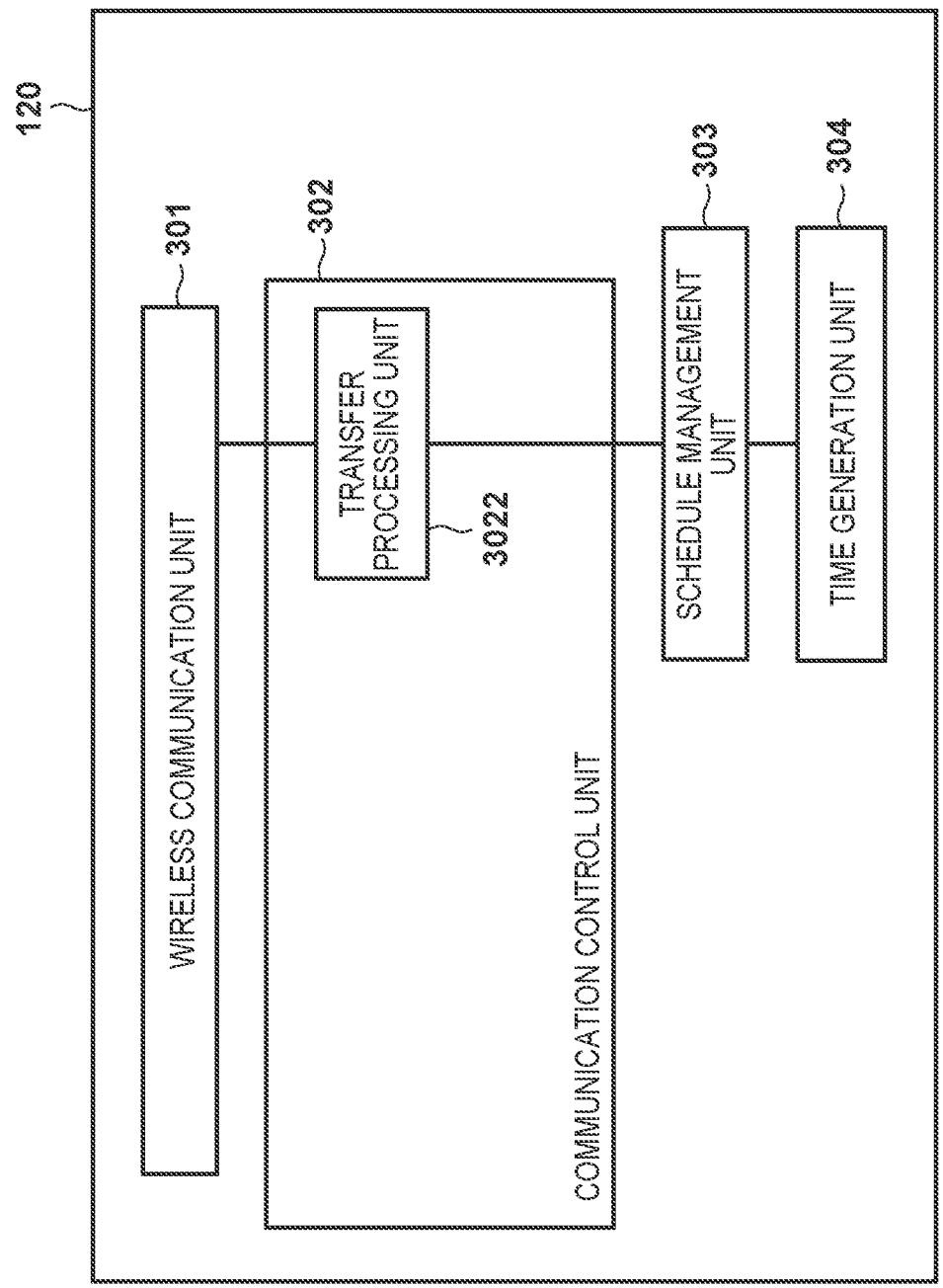
FIG. 3 is a functional block diagram of a relay node according to the embodiment.

FIG. 3 is a block diagram showing the arrangement of the relay node 120. The relay node 120 includes a wireless communication unit 301, a communication control unit 302, a schedule management unit 303, and a time generation unit 304. The communication control unit 302 includes a transfer processing unit 3022.

The wireless communication unit 301, schedule management unit 303, and time generation unit 304 of the relay node 120 have the same functions as those of the wireless communication unit 201, schedule management unit 203, and time generation unit 204 of the transmission node 110, respectively, and a description thereof will be omitted. The communication control unit 302 of the relay node has the same function as that of the communication control unit 202 of the transmission node except that the communication control unit 302 has no transmission processing unit and a description thereof will be omitted. Note that the relay node 120 may optionally have the same arrangement as that of the transmission node 110 or have a function as a transmission node.

Figure 4:
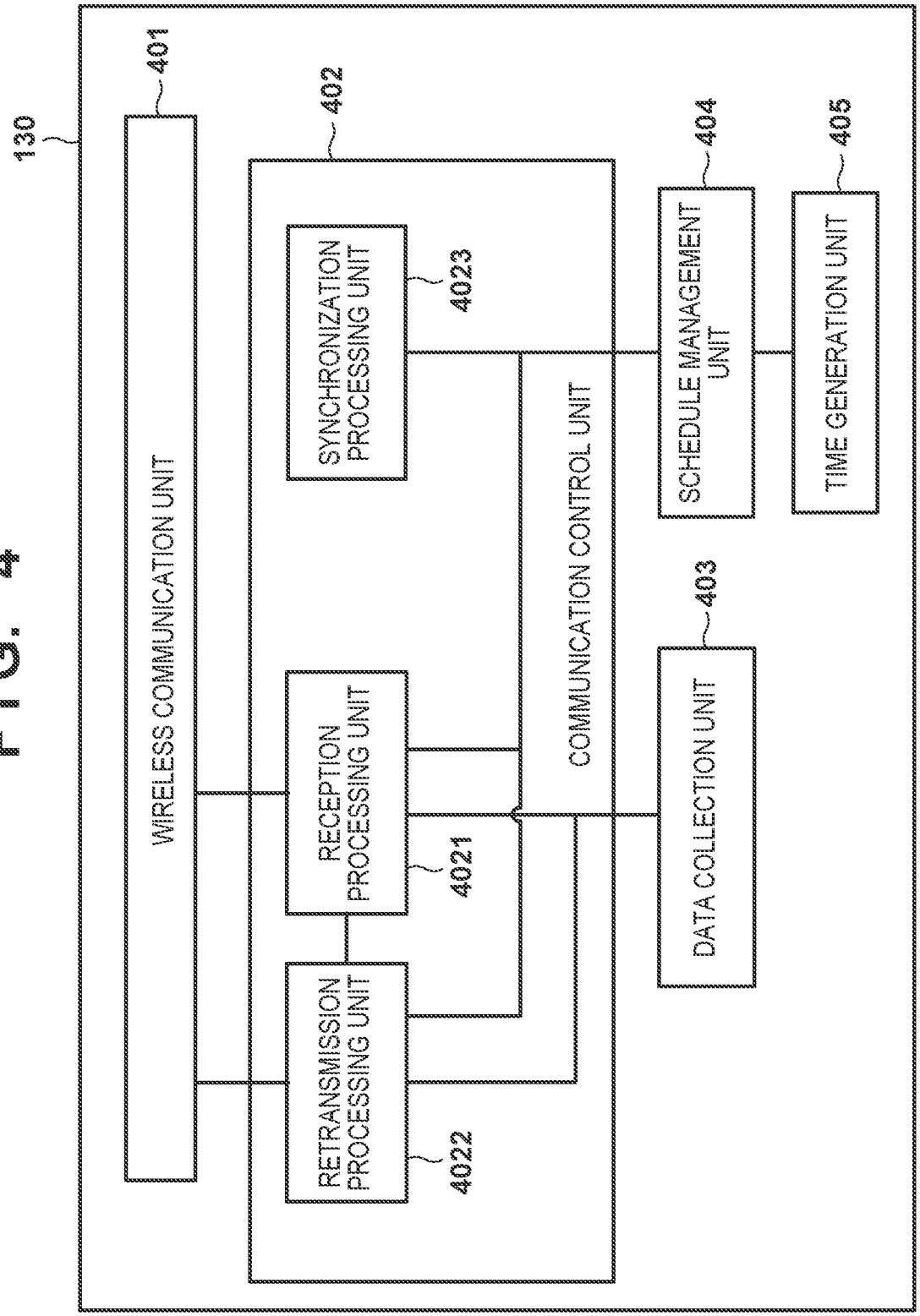
FIG. 4 is a functional block diagram of a sink node according to the embodiment.

FIG. 4 shows an example of the arrangement of the sink node 130. The sink node 130 includes a wireless communication unit 401, a communication control unit 402, a data collection unit 403, a schedule management unit 404, and a time generation unit 405. The communication control unit 402 includes a reception processing unit 4021, a retransmission processing unit 4022, and a synchronization processing unit 4023.

The wireless communication unit 401 is a module that operates as a wireless communication transmission/reception unit, and wirelessly transmits/receives data via an antenna of the wireless communication unit 401 or an external antenna (not shown). The wireless communication unit 401 inspects the second error detection code included in the received packet. If an error is included, the wireless communication unit 401 discards the received packet. The reception processing unit 4021 determines, using the first error detection code included in the received packet data, whether the received data includes an error, and stores the normally received data in the data collection unit 403. If an error is detected from the received data, the retransmission processing unit 4022 can generate a retransmit command to instruct, via the wireless communication unit 401, the transmission node 110 to retransmit the data. The synchronization processing unit 4023 creates and manages a schedule for the whole system. The schedule management unit 404 manages the sub-slot of the self-node. The schedule management unit 404 holds parameters necessary for communication by the flooding method, such as a flooding slot length, a sub-slot length, and the maximum number of transmission in the flooding slot. The time generation unit 405 is a timer.

The synchronization processing unit 4023 periodically transmits a time synchronization packet to each of the transmission node 110 and the relay nodes 120 to create and manage a schedule for the whole system. The sink node 130 encourages the transmission node 110 and the relay nodes 120 to synchronize with each other using the packet sent in the sub-slot of itself. The time synchronization packet is relayed by the flooding method to reach each communication node, like other communication.

In one example, the sink node 130 may optionally include an interface for connecting collected data to an external communication apparatus or a communication unit for transmitting the data to an external apparatus. The communication unit is configured to communicate with a communication network including at least one of a wide area wireless communication network such as cellular communication, a wireless local area network such as Wi-Fi, and a wired network.

An example of communication by the flooding method using concurrent transmission performed by the wireless communication system having the arrangement shown in FIG. 1 will be described next with reference to FIG. 5.

Figure 5:
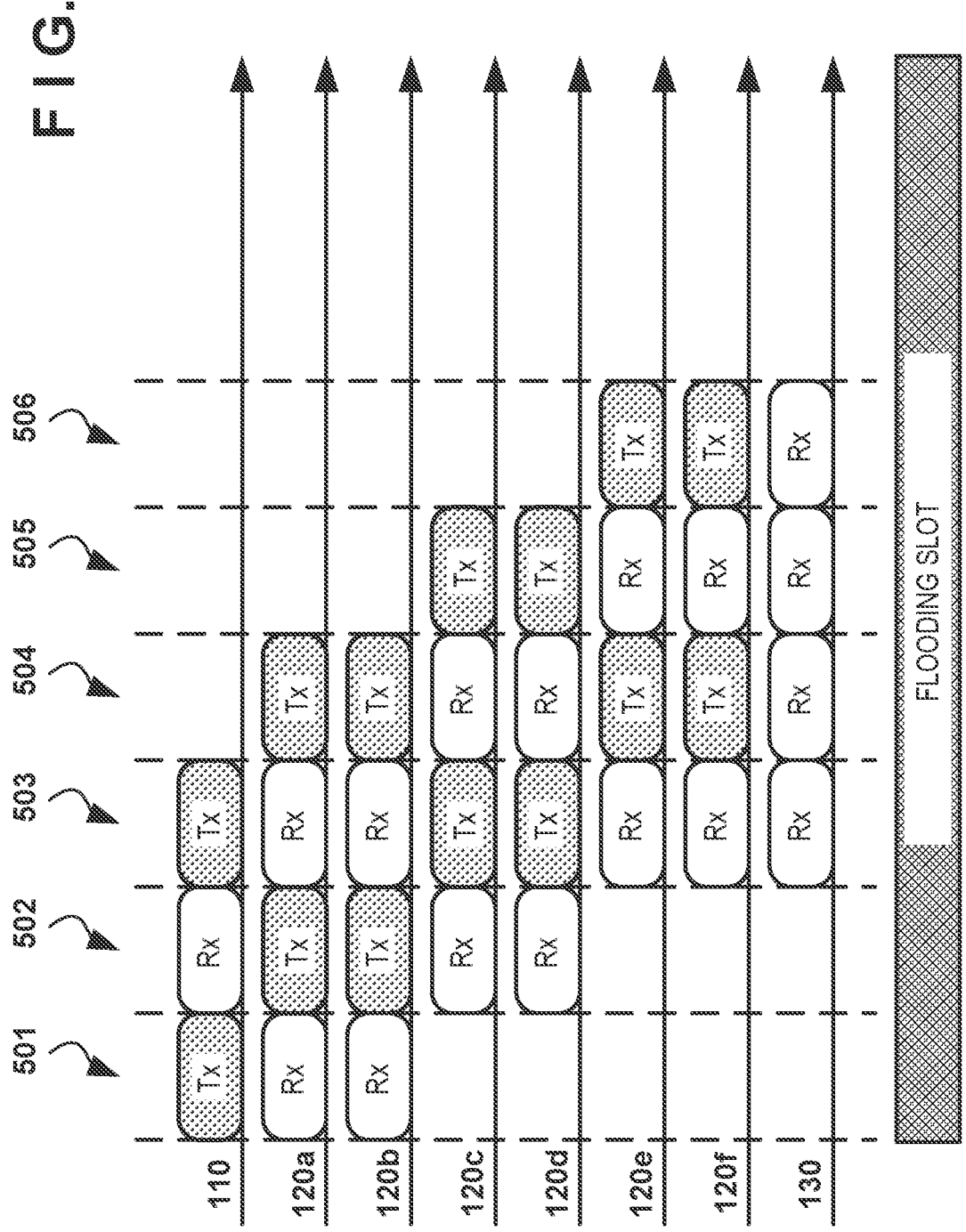
FIG. 5 is a timing chart showing sub-slots in communication using the flooding method according to the embodiment.

FIG. 5 shows an example of the use of the sub-slot of each communication node when communication is performed via the path indicated by the solid lines in the node configuration shown in FIG. 1. Note that this example defines the maximum number of transmissions that can be performed by the communication node in one flooding slot. Assume here that the maximum number of transmissions is two. That is, in the period of one flooding slot, the number of times the communication node can transmit a packet is limited to two.

First, in a first sub-slot 501, the transmission node 110 transmits a packet. Assume that the packet from the transmission node 110 is received by the relay nodes 120a and 120b. Note that in FIG. 5, TX represents transmission of a packet by the communication node and RX represents reception of a packet by the communication node.

Figure 6:
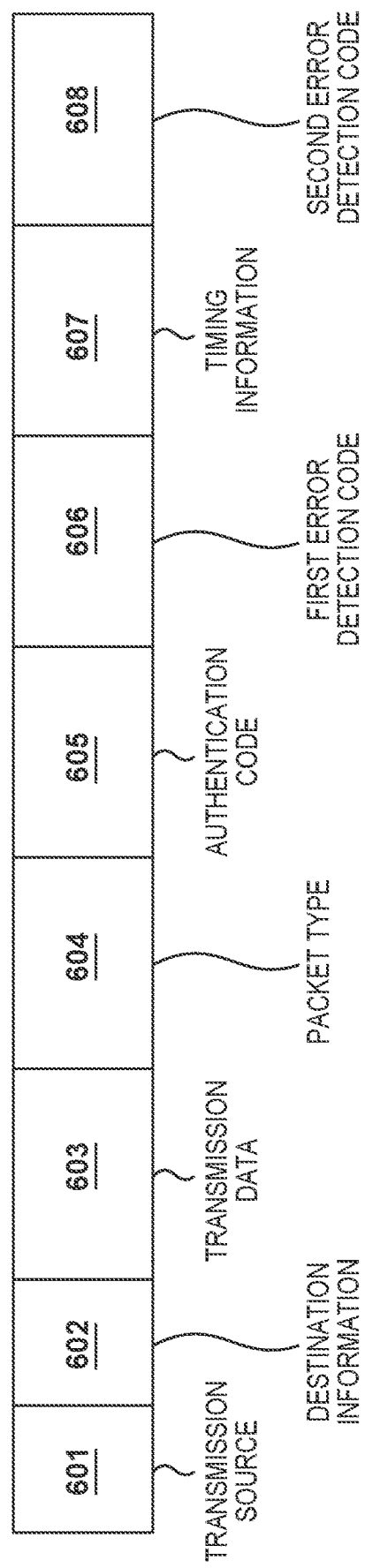
FIG. 6 is a view showing an example of the structure of a packet transmitted/received in communication using the flooding method according to the embodiment.

An example of a packet format transmitted by the transmission node 110 will now be described with reference to FIG. 6.

A transmission source 601 is an identifier indicating the transmission source of a packet, and is information indicating the transmission node 110 in this embodiment. Destination information 602 is an identifier indicating the destination of the packet, and is information indicating the sink node 130 in this embodiment. Transmission data 603 is the payload of the packet, and is information generated based on sensor data acquired by the sensor 206 of the transmission node 110 in this embodiment but is not limited to this. The transmission data 603 may be data from another information processing apparatus. A packet type 604 is information indicating the type of the packet such as a time synchronization packet, a packet for data, or a sleep packet. An authentication code 605 is information used to verify that the transmission node 110 is the valid transmission node 110 in the wireless communication system. This example assumes that a first error detection code 606 is an error detection code generated for predetermined transmission data including at least the transmission data 603 among the data from the transmission source 601 to the authentication code 605 in FIG. 6. Timing information 607 is information indicating a timing at which the packet is transmitted, and is, for example, information corresponding to a sub-slot number in FIG. 5. A second error detection code 608 is an error detection code generated for predetermined transmission data including at least the transmission data 603 and the timing information among the data from the transmission source 601 to the timing information 607 in FIG. 6.

Referring back to FIG. 5, communication by the flooding method will be described. When relaying the packet, the relay node 120 inspects the second error detection code 608 included in the packet, and discards the packet if an error is detected. If no error is detected, the relay node 120 transfers the packet to the next communication node. When transferring the packet, the relay node 120 does not change at least the transmission source 601, the destination information 602, the transmission data 603, and the packet type 604. On the other hand, the relay node 120 changes the timing information 607 and then transfers the packet. Since the timing information is changed, the relay node 120 regenerates and updates the second error detection code 608, reconstructs the packet, and then transfers the packet to the next communication node. The timing information is changed in accordance with the relay timing of the relay node 120, and the relay node 120 updates the second error detection code for the data including the changed timing information at the time of transferring the data.

For example, in the sub-slot 501, the transmission node 110 sets "1" in the timing information 607 and transmits the packet. In the sub-slot 501, the relay nodes 120a and 120b receive the packet transmitted from the transmission node 110.

In a sub-slot 502 following the sub-slot 501, each of the relay nodes 120a and 120b increments the timing information 607 to "2", and transfers the packet. Since the packets transmitted by the plurality of communication nodes in one sub-slot include the same data, and transmission times are synchronized with each other, even if the packets collide with each other, they are decoded without any problem. Therefore, the relay node 120c receives, as one packet, the packets concurrently transmitted from the relay nodes 120a and 120b. Assume that the transmission node 110 and the relay nodes 120c and 120d receive the packets from the relay nodes 120a and 120b.

Subsequently, in a sub-slot 503 following the sub-slot 502, each of the transmission node 110 and the relay nodes 120c and 120d transmits the packets received from the relay nodes 120a and 120b. Each of the transmission node 110 and the relay nodes 120c and 120d sets "3" in the timing information 607 and transfers the received packet. The relay nodes 120a, 120b, 120e, and 120f and the sink node 130 receive the packets from the transmission node 110 and the relay nodes 120c and 120d. At this time, the number of times of transmission by the transmission node 110 is two, and reaches the maximum number of transmissions, and thus no transmission is performed in subsequent sub-slots.

During the period of the flooding slot, a relay operation is performed thereafter, the number of times of transmission of each of the relay nodes 120a and 120b which have transmitted the packets in a sub-slot 504 reaches two as the maximum number of transmissions, and thus no transmission is performed in subsequent sub-slots. In a sub-slot 506, each of the relay nodes 120e and 120f which have received the packets from the relay nodes 120c and 120d in a sub-slot 505 sets "6" in the timing information 607 and transfers the received packet. The sink node 130 receives the packets from the relay nodes 120e and 120f.

Note that when the sink node 130 transmits a time synchronization packet (time synchronization signal) for time synchronization (to be described later), the sink node 130 transmits information to each communication node by flooding, similar to flooding from the transmission node 110 to the sink node 130. In this case, the identifier of the sink node 130 is set in the transmission source 601, information indicating broadcasting is set in the destination information, and information indicating a time synchronization packet is set in the packet type.

In this example, in the sub-slot 501, each of the relay nodes 120c to 120f and the sink node 130 performs reception even if it detects no packet. Furthermore, in the sub-slot 502 as well, each of the relay nodes 120e and 120f and the sink node 130 performs reception. That is, after the flooding slot starts, each of the relay nodes 120a to 120f and the sink node 130 performs a reception operation for receiving the packet.

An example of processing executed by the wireless communication system according to this embodiment will schematically be described next with reference to FIG. 7.

Figure 7:
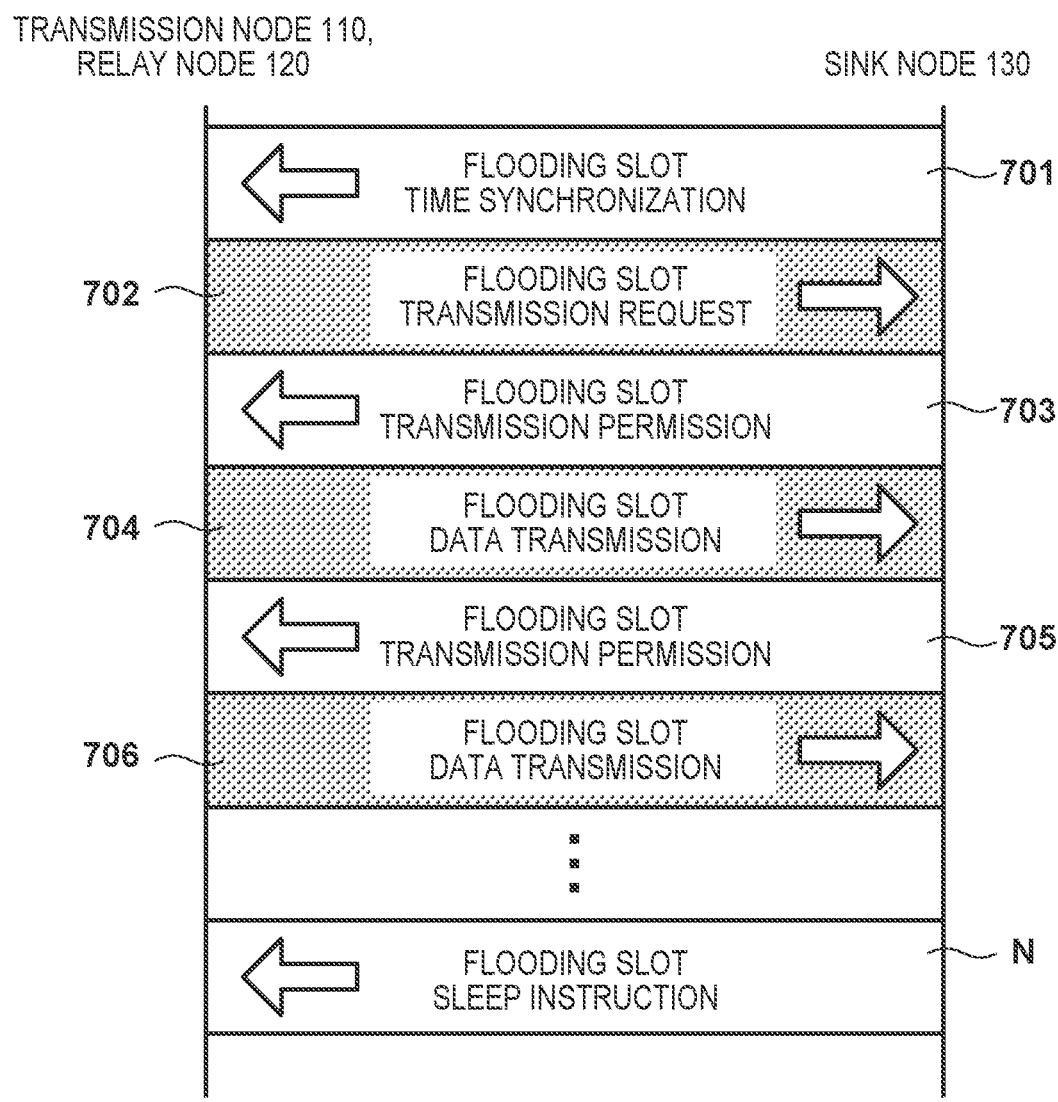
FIG. 7 is a sequence chart showing flooding slots in communication using the flooding method according to the embodiment.

FIG. 7 is a sequence chart of processing from when the sink node 130 executes time synchronization in the wireless communication system until data is collected from the transmission node 110.

As shown in FIG. 7, when, for example, time synchronization is performed, the flooding slot indicates a period until the time synchronization packet transmitted by the sink node 130 is sent to the communication nodes in the network. When the transmission node 110 performs data transmission, the flooding slot indicates a period assigned to transmission from the transmission node 110 to the sink node 130. As described above, each flooding slot represents a period of data transfer by flooding. In other words, one flooding slot indicates a period (downlink) assigned to a series of communication operations from the sink node 130 to at least one node among the transmission node 110 and the relay nodes 120. Alternatively, one flooding slot indicates a period (uplink) assigned to a series of communication operations from at least one communication node among the transmission node 110 and the relay nodes 120 to the sink node 130.

In both the uplink and the downlink, communication by the flooding method described with reference to FIG. 5 is used. In the case of the downlink, the sink node 130 serves as a transmission node. In this case, information indicating the sink node 130 is set in the transmission source 601 of the packet, and information indicating a communication node as a destination or information indicating broadcasting is set in the destination information 602 of the packet.

A flooding slot 701 is a period during which the sink node 130 transmits a time synchronization packet. During this period, the communication nodes in the wireless communication system are notified, by the flooding method, of information necessary for each node in the network to perform time synchronization, for example, time stamp information.

In a flooding slot 702, at a predetermined timing after the time synchronization, the transmission node 110 that has data to be transmitted to the sink node 130 transmits a transmission request packet for requesting data transmission, in which the sink node 130 is set in the destination information 602.

In one example, the transmission node 110 stands by for a random time generated as the predetermined timing using a pseudorandom function or a random number of sub-slots, and then transmits a transmission request packet (transmission request signal). In this case, the transmission node 110 that has received a transmission request packet from another transmission node before transmitting the transmission request packet relays the transmission request packet from the other communication node, and aborts transmission of the transmission request packet of itself. As described above, in the flooding slot 702, the sink node 130 can recognize the communication node that requests data transmission.

Subsequently, in a flooding slot 703, the sink node 130 sets the predetermined transmission node 110 in the destination information 602, and transmits a transmission permission packet for permitting transmission in a next flooding slot 704.

Subsequently, in the flooding slot 704, the transmission node 110 that has been designated by the transmission permission packet starts transmission in this flooding slot. That is, the identifier of the transmission node 110 is set in the transmission source 601, the identifier of the sink node 130 is set in the destination information 602, and then the data is transmitted.

Subsequently, upon determining that sensor data has normally been received in the flooding slot 704, the sink node 130 transmits a transmission permission to another transmission node 110 in a flooding slot 705. In a flooding slot 706 and subsequent flooding slots, uplink transmission of the sensor data is performed the number of times which is equal to the number of flooding slots corresponding to the number of transmission nodes 110 that have received the transmission permission from the sink node 130. After that, in a flooding slot N, the sink node 130 that has determined that data collection from all the transmission nodes 110 is complete transmits a sleep packet (sleep signal) for instructing sleep. Upon receiving the sleep packet, the communication node in the wireless communication system transitions to a sleep state after the end of the flooding slot N until a predetermined time.

<Generation and Addition of Error Detection Code>

Even if the communication nodes are arranged, as shown in FIG. 1, at a timing when the packet transmitted by the transmission node 110 reaches the relay nodes 120a and 120b, the relay node 120c may receive the same packet, as indicated by a dotted line in FIG. 1. In this case, an error may occur in the received data for some reason such as a poor reception condition (for example, a low S/N ratio) in the relay node 120c. This data including the error may be transmitted without detecting the error by the error detection code depending on the condition. Thus, the sink node 130 may receive the error data. Furthermore, if the relay node 120c transmits the error data, the data transmitted by the relay node 120c is different from the data transmitted by the relay nodes 120a and 120b, and thus the packets collide with each other, thereby causing a burst error. The data including the burst error may be relayed to the sink node 130 without being detected by the error detection code. To solve this problem, the data error detection accuracy is improved using the first and second error detection codes.

An operation when the transmission node 110 transmits a packet to the sink node will be described below with reference to FIG. 8. A case in which data of the sensor is transmitted will be exemplified here. The transmission node 110 receives data from the sensor 206 (S801). The transmission processing unit 2021 sets, in a packet, the transmission source 601 for identifying the transmission node and the destination information 602 for identifying the transmission destination. In this example, "data" is set in the packet type 604. Furthermore, the data from the sensor is set in the transmission data 603 and the authentication code 605 of the transmission node 110 is set. Then, the first error detection code 606 is generated for the transmission source 601, the destination information 602, the transmission data 603, the packet type 604, and the authentication code 605 (S802). The target for which the first error detection code 606 is generated may be, for example, the transmission data 603 instead of all the data from the transmission source 601 to the authentication code 605 shown in FIG. 6. Next, the transmission node 110 acquires timing information, and sets it in the timing information 607 of the packet. For example, "1" is set in the timing information 607 (S803). Subsequently, the transmission node 110 generates the second error detection code 608 for all the data from the transmission source 601 to the timing information 607 and adds it to the packet (S805), and then transmits the packet by the flooding method (S806). When generating the second error detection code as well, the second error detection code may be generated for, for example, the transmission data 603, the first error detection code 606, and the timing information 607 instead of all the data.

The operation of the relay node 120 will be described with reference to FIG. 9. The relay node 120 receives the packet (S901), and inspects the second error detection code 608 included in the packet (S902). If an error is detected, the relay node 120 discards the packet, and does not relay the packet. After that, the relay node 120 restarts to receive the packet (S901). If no error is detected, the relay node 120 updates the timing information 607 of the packet (S903). As the update operation, for example, the timing information 607 is incremented by one to be set to "2". If the received timing information 607 is "3", it is incremented by one to be set to "4". As described with respect to the transmission node, the relay node 120 generates the new second error detection code 608 for all the data from the transmission source 601 to the timing information 607 (S904), reconfigures the packet (S905), and transmits the packet by the flooding method (S906). The second error detection code may be generated for, for example, the transmission data 603, the first error detection code 606, and the timing information 607 instead of all the data.

The operation of the sink node 130 will be described with reference to FIG. 10. The sink node 130 receives the packet transmitted by flooding (S1001). With respect to the received packet, the sink node 130 inspects the second error detection code 608. If an error is detected by the second error detection code 608, the packet is discarded (S1002). If no error is detected, the first error detection code 606 is inspected. If an error is detected, the packet is discarded (S1003). If no error is detected, the received data is stored in the data collection unit 403 (S1004).

A code whose detection accuracy is higher than that of the second error detection code 608 is used as the first error detection code 606. For example, since the second error detection code 608 needs to be updated in the relay node

120, CRC16 which is readily implemented by hardware and can be generated in a short time is adopted. If CRC16 is adopted, a format complying with 802.15.4 can be used, thereby obtaining benefits such that, for example, a communication chip complying with the standard can be used and wireless regulations are readily satisfied. It is possible to detect a data error between the nodes by the second error detection code 608. The first error detection code 606 is generated by the transmission node 110, is inspected by the sink node 130, and is not changed by the relay node 120. For example, CRC32 is adopted as the first error detection code 606. Since CRC32 is processed by only the transmission node 110 and the sink node 130, it is possible to improve the error detection accuracy for the data without particularly increasing delay in relaying and power consumption at the time of relaying. Error detection is performed for the data using the first error detection code 606 and the second error detection code 608 appropriately. This allows the sink node 130 to detect, by the first error detection code 606, for example, a burst error or the like missed by the second error detection code 608.

The invention is not limited to the foregoing embodiments, and various variations/changes are possible within the spirit of the invention.

REFERENCE SIGNS LIST

110: transmission node, 120*a*-120*f*: relay node, 130: sink node

What is claimed is:

1. A communication system for performing communication by flooding using concurrent transmission among a plurality of communication nodes, the plurality of communication nodes including one of a transmission node configured to generate and transmit a packet, a relay node configured to relay the packet, and a destination node as a destination of the packet, the system comprising:
the transmission node generates and transmits the packet including predetermined transmission data, a first error detection code for at least the transmission data, and a second error detection code for at least the transmission data, timing information corresponding to a transmission timing of the packet, and the first error detection code,
the relay node receives the packet, performs error detection based on the second error detection code, and discards the packet if an error is detected, and updates the second error detection code and reconstructs and transmits the packet if no error is detected, and
the destination node receives the packet from one of the transmission node and the relay node, and performs error detection based on at least the first error detection code,
wherein the second error detection code is generated for all data except for the second error detection code in the packet, and the first error detection code is generated for at least part of all data except for the timing information, the first error detection code, and the second error detection code in the packet.

2. The communication system according to claim 1, wherein the timing information is changed when the relay node relays the packet.

3. The communication system according to claim 1, wherein the first error detection code is generated for all data except for the timing information, the first error detection code, and the second error detection code in the packet.

4. The communication system according to claim 1, wherein the first error detection code and the second error detection code are error detection codes in a data link layer.

5. The communication system according to claim 1, wherein a bit length of the first error detection code is longer than a bit length of the second error detection code.

6. A communication method for performing communication by flooding using concurrent transmission among a plurality of communication nodes, the plurality of communication nodes including one of a transmission node configured to generate and transmit a packet, a relay node configured to relay the packet, and a destination node as a destination of the packet, the method comprising:
causing the transmission node to generate and transmit the packet including predetermined transmission data, a first error detection code for at least the transmission data, and a second error detection code for at least the transmission data, timing information corresponding to a transmission timing of the packet, and the first error detection code,
causing the relay node to receive the packet, perform error detection based on the second error detection code, and discard the received packet if an error is detected, and update the second error detection code and reconstruct and transmit the packet if no error is detected, and
causing the destination node to receive the packet from one of the transmission node and the relay node, and perform error detection based on at least the first error detection code,
wherein the second error detection code is generated for all data except for the second error detection code in the packet, and the first error detection code is generated for at least part of all data except for the timing information, the first error detection code, and the second error detection code in the packet.

7. The communication method according to claim 6, wherein the timing information is changed when the relay node relays the packet.

8. The communication method according to claim 6, wherein the first error detection code is generated for all data except for the timing information, the first error detection code, and the second error detection code in the packet.

9. The communication method according to claim 6, wherein the first error detection code and the second error detection code are error detection codes in a data link layer.

10. The communication method according to claim 6, wherein a bit length of the first error detection code is longer than a bit length of the second error detection code.

11. A communication apparatus comprising an input unit configured to input data, a control unit configured to generate a packet including the data, a transmission unit configured to transmit the packet, and a reception unit configured to receive a packet,
wherein when transmitting the data input to the input unit, the control unit generates a first error detection code for at least the data and a second error detection code for at least the data, timing information corresponding to a transmission timing of the packet, and the first error detection code, and generates the packet including the data, the timing information, the first error detection code, and the second error detection code, and
when relaying the packet received by the reception unit, the control unit performs error detection based on the second error detection code included in the received packet, and discards the received packet if an error is detected, and updates the second error detection code and reconstructs the packet if no error is detected, wherein the second error detection code is generated for all data except for the second error detection code in the packet, and the first error detection code is generated for at least part of all data except for the timing information, the first error detection code, and the second error detection code in the packet.

12. The communication apparatus according to claim 11, wherein the timing information is changed when the packet is relayed.

13. The communication apparatus according to claim 11, wherein the first error detection code is generated for all data except for the timing information, the first error detection code, and the second error detection code in the packet.

14. The communication apparatus according to claim 11, wherein the first error detection code and the second error detection code are error detection codes in a data link layer.

15. The communication apparatus according to claim 11, wherein a bit length of the first error detection code is longer than a bit length of the second error detection code.

* * * * *